(12) United States Patent
Valcamp et al.

(10) Patent No.: US 7,563,009 B2
(45) Date of Patent: Jul. 21, 2009

(54) HEADLAMP WITH BEAM PATTERNS FORMED FROM SEMICONDUCTOR LIGHT SOURCES

(75) Inventors: David J. Valcamp, Frankford (CA); Ronald O. Woodward, Yorktown, VA (US)

(73) Assignee: Magna International (CA)

( * ) Notice: Subject to any disclaimer, the term of this patent is extended or adjusted under 35 U.S.C. 154(b) by 4 days.

(21) Appl. No.: 11/827,283

(22) Filed: Jul. 11, 2007

(65) Prior Publication Data

US 2007/0258260 A1     Nov. 8, 2007

Related U.S. Application Data

(63) Continuation of application No. 11/111,534, filed on Apr. 21, 2005, now Pat. No. 7,258,474.

(51) Int. Cl.
*F21S 8/10* (2006.01)

(52) U.S. Cl. .................. 362/545; 362/507; 362/511; 362/555; 362/800

(58) Field of Classification Search .......... 362/507, 362/511, 521, 545, 551, 554, 555, 800; 359/642, 359/809
See application file for complete search history.

(56) References Cited

U.S. PATENT DOCUMENTS

| | | | |
|---|---|---|---|
| 4,389,698 A | 6/1983 | Cibie | |
| 4,949,227 A | 8/1990 | Finch et al. | |
| 5,222,793 A | 6/1993 | Davenport et al. | |
| 5,436,806 A | 7/1995 | Kato | |
| 5,931,576 A | 8/1999 | Kreysar et al. | |
| 6,152,588 A | 11/2000 | Scifres | |
| 6,371,635 B2 | 4/2002 | Ott et al. | |
| 6,406,172 B1 | 6/2002 | Harbers et al. | |
| 6,491,420 B1 | 12/2002 | Scifres | |
| 7,258,474 B2 * | 8/2007 | Valcamp et al. ............. | 362/545 |
| 2004/0149998 A1 | 8/2004 | Henson et al. | |
| 2004/0223337 A1 | 11/2004 | Ishida | |

FOREIGN PATENT DOCUMENTS

DE     103 12 950 A1     10/2004

* cited by examiner

*Primary Examiner*—Sandra L O'Shea
*Assistant Examiner*—Meghan K Dunwiddie
(74) *Attorney, Agent, or Firm*—Warn Partners, P.C.; Marc Luddy

(57) ABSTRACT

The headlamp system of the present invention includes a source array of semiconductor light sources and a lens system to produce a first component, such as spread light, of desired beam patterns and a source array of semiconductor light sources and a lens system to produce a second component, such as the hot spot components, of the desired beam patterns. Light from the semiconductor light sources of each source array is transferred to the respective lens system by a transfer device comprising a series of light pipes which capture light emitted by the semiconductor light sources and emit the captured light adjacent the respective lens systems. One or both source arrays can include additional semiconductor light sources which are selectively illuminated or extinguished to provide steering hot spots in the beam pattern to illuminate areas adjacent the vehicle over which the vehicle will be turned.

36 Claims, 11 Drawing Sheets

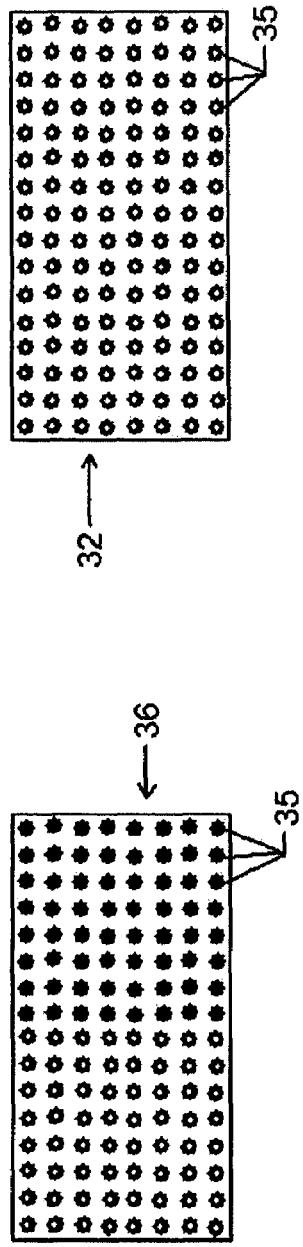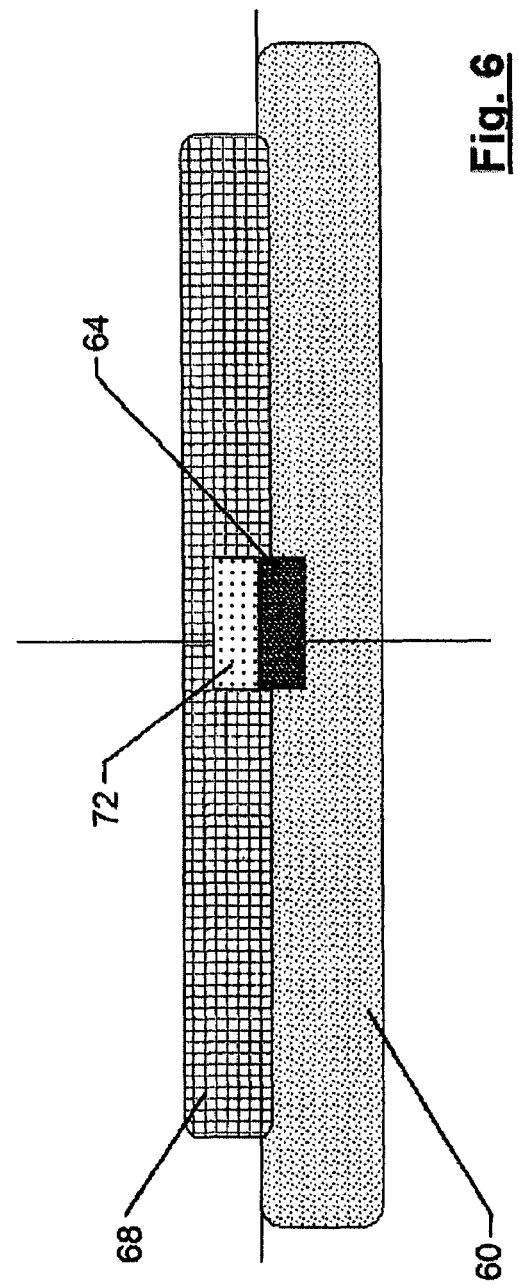

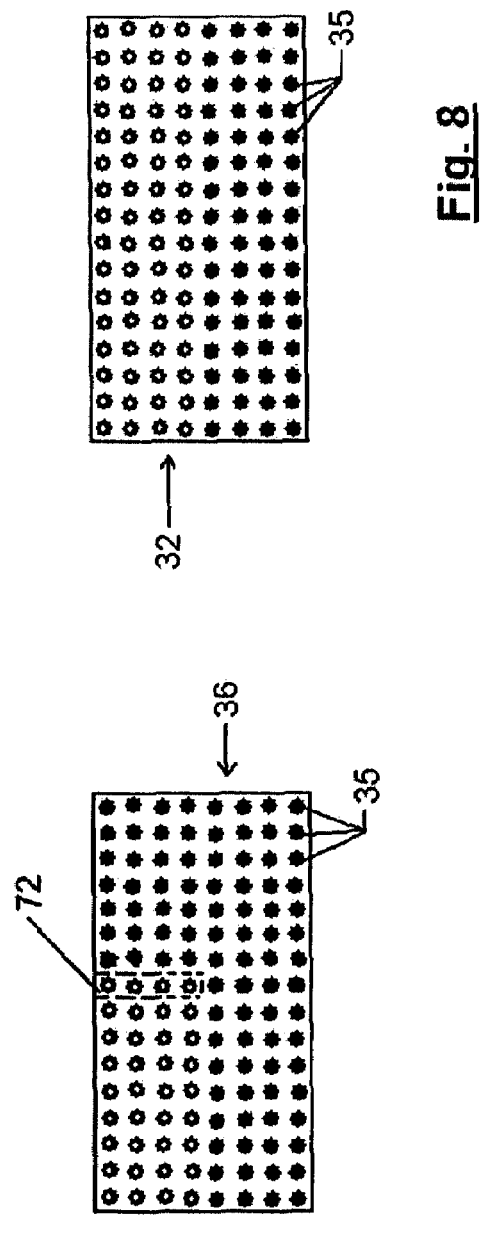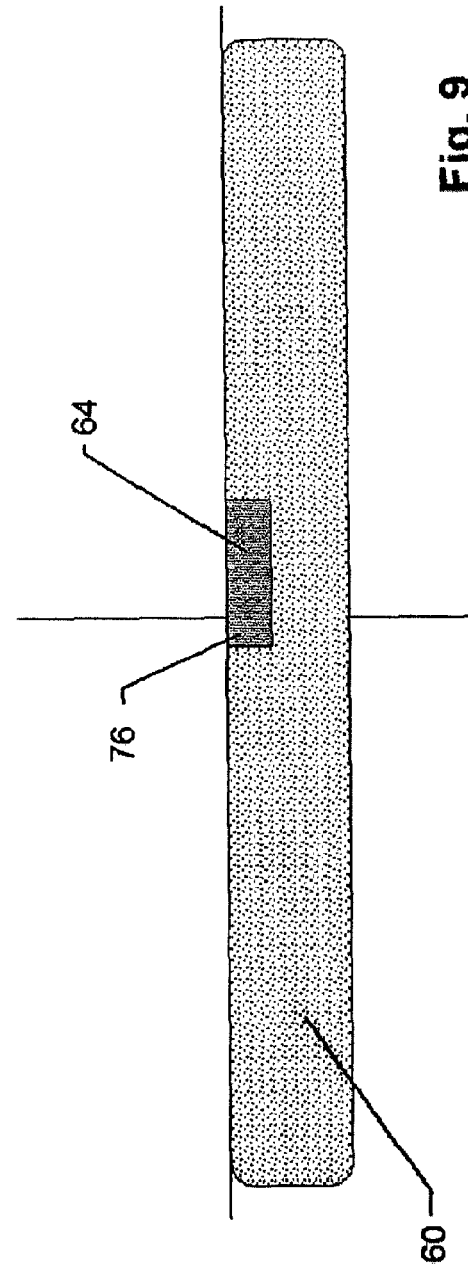

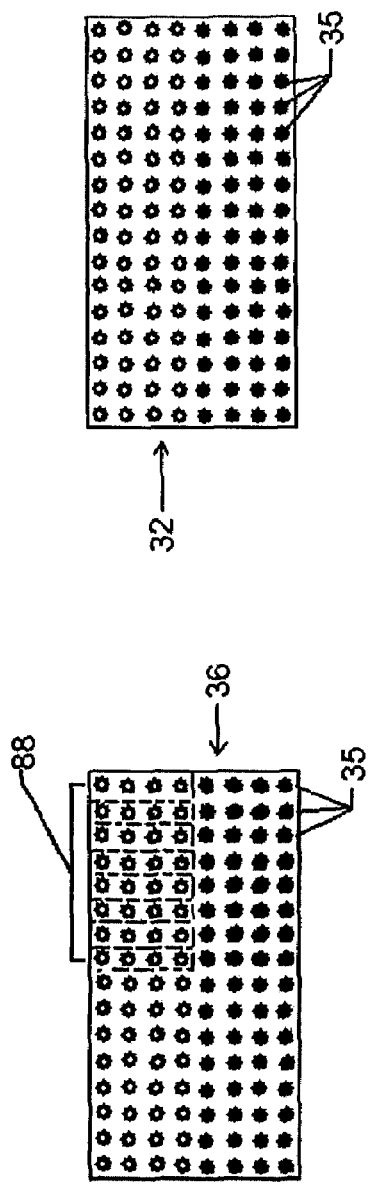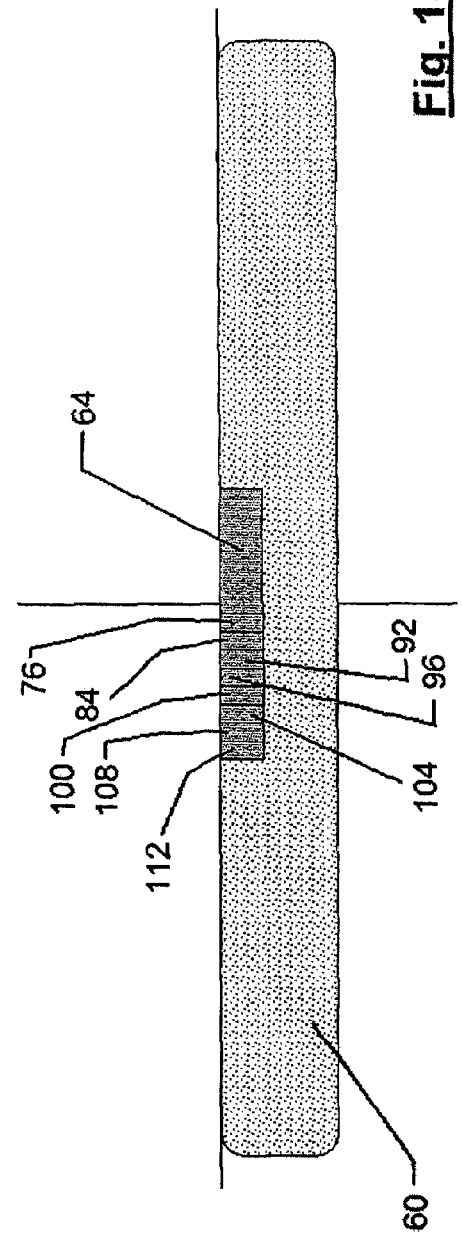

HEADLAMP WITH BEAM PATTERNS FORMED FROM SEMICONDUCTOR LIGHT SOURCES

CROSS-REFERENCE TO RELATED APPLICATIONS

This application is a continuation of U.S. patent application Ser. No. 11/111,534 filed on Apr. 21, 2005.

FIELD OF THE INVENTION

The present invention generally relates to vehicular headlamps and more specifically to vehicular headlamps whose desired beam patterns are formed from light emitted by semiconductor light sources.

BACKGROUND OF THE INVENTION

A design consideration of vehicular headlamp systems concerns maximum and minimum illumination levels and produced beam patterns. In addition to this concern, aesthetic and physical design factors also play a role in the design of headlamps. Conventional incandescent and gas discharge headlamp systems have required a relatively large volume for their components, limiting the ability to design and implement more compact headlamp systems. Accordingly, it has been suggested to employ semiconductor light sources in headlamp systems as light sources.

While recent advances in the manufacture and/or design of semiconductor light sources have resulted in light sources, such as white light emitting diodes (LEDs), achieving relatively high light output levels, multiple semiconductor light sources must still be employed in a headlamp system to obtain the required levels of light output for a headlamp. Further, semiconductor sources introduce new design challenges to headlamp systems. For example, semiconductor light sources act much more like ideal point sources of light than incandescent and/or gas discharge bulbs and thus conventional headlamp optical designs may not be compatible with semiconductor light sources. In addition, issues such as the need to provide the necessary cooling of semiconductor light sources further complicate the design of headlamp systems employing semiconductor light sources.

Another long felt need in the area of vehicular headlamps is the ability to illuminate the area of the road where the vehicle is going to travel, rather than (or in addition to) the area of the road in front of the vehicle. Previous attempts have been made to provide steerable headlamps to address this issue and most of these prior art systems have included mechanical means to physically turn the headlamp, or a portion of the optics (such as a reflector and/or lens) in the headlamp, with the front wheels of the vehicle to direct the illumination from the headlamp in the desired direction. A variety of techniques have been attempted for the control of steerable headlamps, ranging from mechanical linkages with the steering mechanism of the vehicle to microprocessor controlled servo-motor driven systems.

However, such systems suffer from disadvantages in that the control mechanisms to turn the headlamp can be quite complex, expensive and/or fragile. Other prior art systems have included an additional light source in each headlamp, the left headlamp having an additional light source to illuminate the area to the left of the car and the right headlamp having an additional light source to illuminate the area to the right of the car and these additional light sources are turned on or off, appropriately, as the front wheels of the vehicle are turned. These systems also suffer from disadvantages as the area illuminated by the additional light sources is fixed and does not change with the vehicle speed or turn angle and thus the resulting beam pattern may not provide the desired illumination.

Accordingly, there exists a need for new and improved vehicular headlamp systems whose desired beam patterns are formed from light emitted by semiconductor light sources.

SUMMARY OF THE INVENTION

It is an object of the present invention to provide a novel semiconductor headlamp system that obviates or mitigates at least one disadvantage of the prior art.

According to a first aspect of the present invention, there is provided a headlamp system for a vehicle, comprising: a first array of semiconductor light sources; a second array of semiconductor light sources; a first lens system; a second lens system; a first transfer device operable to transfer light emitted from semiconductor light sources on the first array to the first lens system, the first lens system operable to produce a first component of a desired beam pattern; and a second transfer device operable to transfer light emitted from semiconductor light sources on the second array to the second lens system, the second lens system operable to produce a second component of a desired beam pattern.

Preferably, the first transfer device includes a light pipe for each respective semiconductor light source in the first array of semiconductor light sources and wherein each respective light pipe has a first end adjacent the respective semiconductor light source, to capture light emitted from the respective semiconductor light source, and a second end to emit the captured light onto the first lens system and wherein the second transfer device includes a light pipe for each respective semiconductor light source in the second array of semiconductor light sources and wherein each respective light pipe has a first end adjacent the respective semiconductor light source, to capture light emitted from the respective semiconductor light source, and a second end to emit the captured light onto the second lens system.

Also preferably, at least some of the semiconductor light sources of at least one of the first and second arrays of semiconductor light sources of the headlamp system are selectively illuminated or extinguished to form a desired beam pattern from the headlamp system.

Also preferably, additional semiconductor light sources on one of the first and second array of semiconductor light sources are illuminated to produce at least one steering hot spot in addition to the desired beam pattern.

According to a second aspect of the present invention, there is provided a headlamp system for a vehicle, comprising: a first array of semiconductor light sources; a second array of semiconductor light sources; a first lens system; a second lens system; a first transfer device operable to transfer light emitted from semiconductor light sources on the first array to the first lens system, the first lens system operable to produce a first component of a desired beam pattern; and a second transfer device operable to transfer light emitted from semiconductor light sources on the second array to the second lens system, the second lens system operable to produce a second component of a desired beam pattern; wherein at least one of the semiconductor light sources of at least one of the first and second array of semiconductor light sources is selectively illuminated or extinguished to form a desired beam pattern from the headlamp system.

According to a third aspect of the present invention, there is provided a headlamp system for a vehicle, comprising: a first array of semiconductor light sources; a second array of semiconductor light sources; a first lens system; a second lens system; a first transfer device operable to transfer light emitted from semiconductor light sources on the first array to the first lens system, the first lens system operable to produce the spread light component of a desired beam pattern; and a second transfer device operable to transfer light emitted from semiconductor light sources on the second array to the second lens system, the second lens system operable to produce at least one hot spot component of a desired beam pattern; wherein at least some of the semiconductor light sources on at least one of the first and second array of semiconductor light sources are selectively illuminated or extinguished to form a desired beam pattern from the headlamp system and wherein additional semiconductor light sources on at least one of the first and second array of semiconductor light sources are illuminated to produce at least one steering hot spot in addition to the desired beam pattern.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Preferred embodiments of the present invention will now be described, by way of example only, with reference to the attached Figures, wherein:

FIG. 5 shows the two arrays of FIG. 3 with all of the sources on one array illuminated to provide spread light of a high beam pattern and some sources on the other array being illuminated to provide the hot spots of the high beam pattern, in accordance with the present invention;

FIG. 6 shows a schematic representation of the high beam pattern of FIG. 5, in accordance with the present invention;

FIG. 8 shows the two arrays of FIG. 3 wherein additional semiconductor light elements have been illuminated on one array to provide a low beam steering hot spot, in accordance with the present invention;

FIG. 9 shows a schematic representation of the low beam pattern with the low beam steering hot spot produced from the arrays of FIG. 8, in accordance with the present invention;

FIG. 14 shows the two arrays of FIG. 11 wherein eight sets of additional semiconductor light elements have been illuminated on one array to provide a eight low beam steering hot spots, in accordance with the present invention;

FIG. 15 shows a schematic representation of the low beam pattern with the eight low beam steering hot spots produced from the arrays of FIG. 14, in accordance with the present invention;

DETAILED DESCRIPTION OF THE INVENTION

Figure 1:
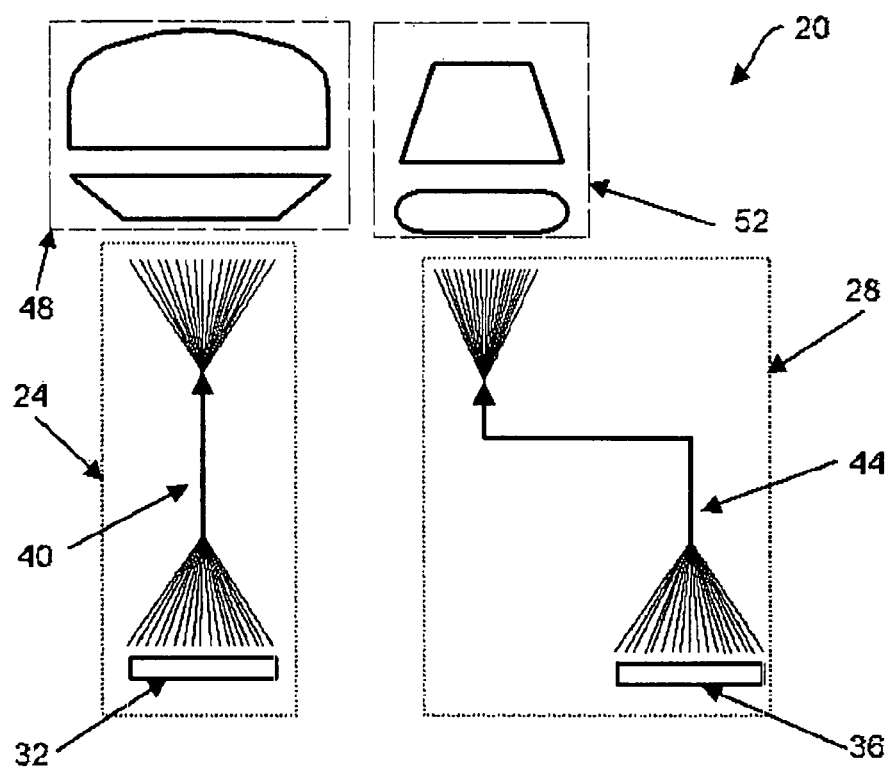
FIG. 1 shows a schematic representation of a headlamp system, in accordance with the present invention.

Referring to the Figures generally, and specifically to FIG. 1, a headlamp system in accordance with the present invention is indicated generally at 20. System 20 includes two light engines 24, 28, respectively, each of which includes a light source array 32, 36, respectively, of semiconductor light sources 35.

Figure 2:
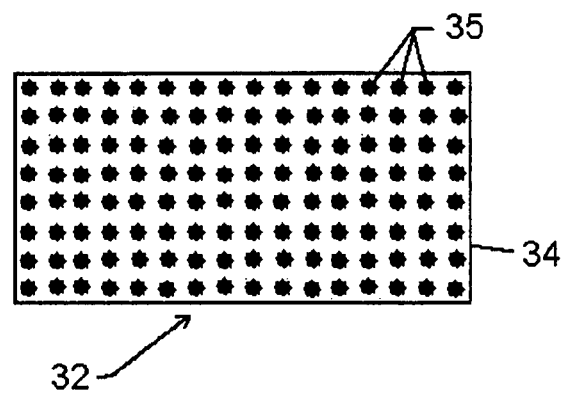
FIG. 2 shows a schematic representation of an array of semiconductor light sources, in accordance with the present invention.

Referring to FIG. 2, source array 32 includes a substrate 34 on which a plurality of semiconductor light sources 35 are mounted. Source array 36 can be similarly constructed. While source arrays 32, 36, respectively, are shown in the Figures as having separate substrates 34, both source arrays can share a common substrate 34, if desired, or each source array can be a composite of two or more substrates 34.

Semiconductor light sources 35 can be any suitable semiconductor light source, such as LED devices that emit white light, and/or the like. Substrate 34 can be any suitable substrate capable of supporting semiconductor light sources 35, the necessary electrical conductors to supply power to semiconductor light sources 35, and heat removal means to assist in moving waste heat created by operation of semiconductor light sources 35 away from those semiconductor light sources 35.

In a present embodiment of system 20, substrate 34 can be a multilayer printed circuit board (PCB) to which semiconductor light sources 35 are surface mounted. The PCB includes at least one heat transfer layer, such as a layer of copper or other material with good thermal transfer characteristics, which acts as a heat removal means to which a heat sink can be attached to remove waste heat produced by the semiconductor light sources 35. The PCB includes the necessary conductor traces to provide power to semiconductor light sources 35. As will be apparent those of skill in the art, a heat pipe, wick or other suitable means can be employed instead of, or in addition to, the PCB heat transfer layer to remove waste heat produced by the operation of semiconductor light sources 35.

Each semiconductor light source 35 can be individually addressable and thus can be activated or deactivated independently of the other semiconductor light sources 35 and can be operated at a variety of output levels. However, it is contemplated that, if desired, semiconductor light sources 35 and the power traces can be arranged such that light sources 35 can be activated or deactivated and their output levels selected, in groups comprising two or more light sources 35.

Referring again to FIG. 1, light engines 24, 28, respectively, further include transfer devices 40, 44, respectively, which transfer the light emitted by the semiconductor light sources 35 on source arrays 32, 36, respectively, to desired light output locations in headlamp system 20. In a present embodiment of system 20, transfer devices 40, 44, respectively, comprise bundles of light pipes, each light pipe of a bundle having a receiving end (e.g., located adjacent a respective semiconductor light source 35 in a source array 32 or 36) and an emitting end (e.g., at the location wherein it is desired to have the emitted light). The light pipes of transfer devices 40, 44 can be constructed in a variety of manners and can be fiber optic cables, light guides manufactured from polycarbonate or transparent silicone rubber or moldable acrylic resins, such as Acrymid™ 815, sold by CYRO Industries of Rockaway, N.J. or any other suitable method of transferring light from a light source to a desired location.

The light pipes can also be constructed from an inner optical glass member clad in a second glass which has a lower index of refraction than the inner optical glass to enhance internal reflection of the light from semiconductor sources 35 through the light pipe. In a specific embodiment, the inner optical glass has an index of refraction of 1.81 while the cladding glass has an index of refraction of 1.48 which results in a numerical aperture for the light pipe of 1.0. As will be apparent to those of skill in the art, other two-glass combinations can be used to fabricate the light pipes or combinations of relatively high index glass and other, relatively lower index, cladding materials can also be used to fabricate the light pipes.

The light pipes of transfer devices 40, 44, respectively, can be arranged in known manners to capture a relatively large amount, and preferably substantially all, of the light produced by the semiconductor light sources 35 of source arrays 32, 36, respectively. By way of a non-limiting example, the ends of the light pipes adjacent each semiconductor light source 35 are optically flat surfaces to enhance the capture of emitted light and appropriate reflectors (not shown) can be mounted about each semiconductor light source 35 on substrate 34 to direct the emitted light from semiconductor light sources 35 into the respective light pipes of transfer devices 40, 44, respectively.

By way of a non-limiting example, the emitting end of transfer device 40 can be located adjacent a lens system 48 and the emitting end of transfer device 44 can be located adjacent a lens system 52. Lens systems 48, 52, respectively, can be single lens systems or multi-lens systems. In a present embodiment, each of lens system 48, 52, respectively, can be a two lens system, as is described below.

It is further contemplated that the emitting ends of the light pipes of one or both transfer devices 40, 44 can be vertically and/or horizontally spaced, or staggered, with respect to their respective lens systems 48 and 52 to produce desired features in a beam pattern, such as lighting to illuminate roadside signs, etc.

Further, as should now be apparent to those of skill in the art, by employing transfer devices 40 and 44, the location and arrangement of the light emitted from the emitting ends of transfer devices 40 and 44 can be established independent of the location, spacing and arrangement of semiconductor light sources 35 on source arrays 32 and 36. Transfer devices 40, 44, respectively, also allow source arrays 32, 36, respectively, to be located distal from lens systems 48, 52, respectively, thus allowing any required cooling mechanisms, such as relatively large heat exchange members, cooling fans, and/or the like to be located in aesthetically acceptable locations, rather than proximal lens systems 48, 52, respectively.

In this manner, vehicle designers have more flexibility in their aesthetic and functional designs of vehicles as only lens systems 48, 52, respectively, and the emitter ends of transfer devices 40, 44, respectively, need be located in one of the conventional locations for a headlamp system and the remainder of the headlamp system 20 can be located elsewhere.

Headlamp beam patterns typically comprise spread light, which illuminates a relatively large portion of the beam pattern at relatively even illumination levels, and hot spots which are relatively small areas of increased illumination levels typically superimposed on areas of the spread light. The headlamp system, especially with respect to beam patterns, should be carefully designed and configured to ensure that both the area and illumination levels of the spread illumination and the area and the illumination levels of the hot spots are within acceptable regulatory limits.

In headlamp system 20, light engine 24 and lens system 48 are preferably employed to provide the spread light, while light engine 28 and lens system 52 are preferably employed to provide the hot spot light and dynamic light, as described below. Accordingly, lens system 48 can be designed to direct the light from the emitter end of transfer device 40 to produce the desired spread light of the beam pattern from headlamp system 20.

Figure 3:
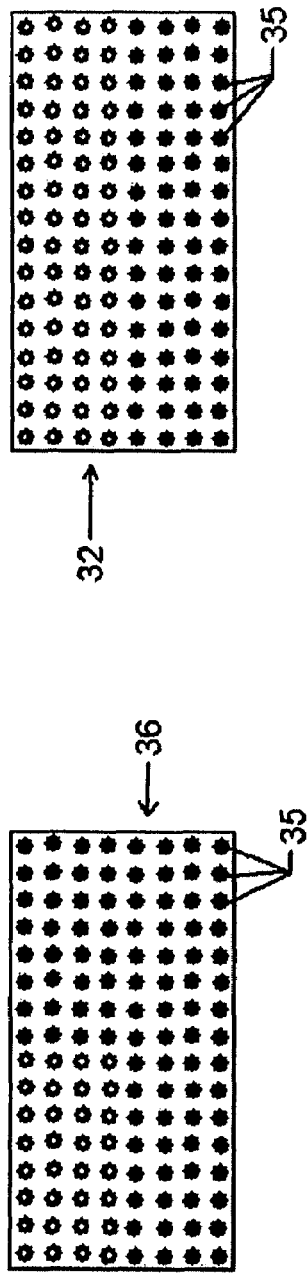
FIG. 3 shows two arrays of semiconductor light sources with some sources on one array illuminated to provide the spread light of a low beam pattern and some sources on the other array being illuminated to provide a hot spot of the low beam pattern, in accordance with the present invention.

Referring to FIG. 3, source arrays 32, 36, respectively, are shown wherein semiconductor light sources 35 that are illuminated are indicated with symbols with hollow centers while the non-illuminated semiconductor light sources 35 are indicated with solid symbols. As shown, about half of the semiconductor light sources 35 on light source array 32 are illuminated and the light produced by these semiconductor light sources 35 can be transferred, by transfer device 40, to lens system 48 to create the spread component 60 of the low beam pattern illustrated in FIG. 4 against reference horizontal and vertical axes.

Lens system 48 includes a first lens which serves to vertically limit the beam pattern produced by lens system 48 and also includes a second lens which horizontally spreads the beam pattern produced by lens system 48.

Figure 4:
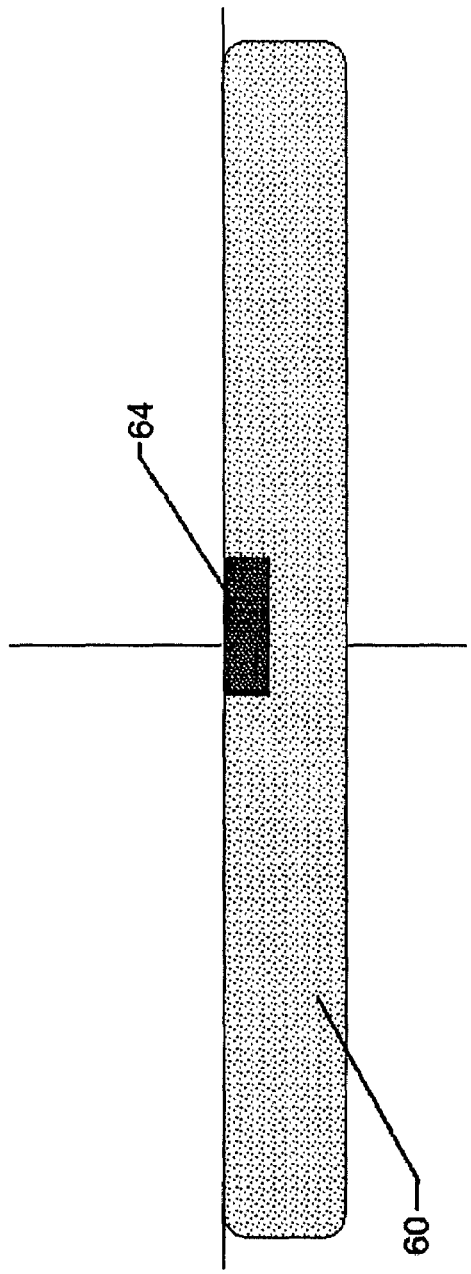
FIG. 4 shows a schematic representation of the low beam pattern of FIG. 3, in accordance with the present invention.

As is also shown, about one quarter of the of the semiconductor light sources 35 on light source array 36 are illuminated and the light produced by these semiconductor light sources 35 can be transferred, by transfer device 44, to lens system 52 to create the hot spot component 64, which typically may be about three degrees high and six degrees wide, of the low beam pattern illustrated in FIG. 4. While lens system 52 could employ a single lens to provide the desired hot spot, such a single lens could not easily produce the steerable light, discussed below, and thus lens system 52 also employs two lenses. The first lens of lens system 52 can be located relatively close to the emitter ends of transfer device 44 and projects the light from transfer device 44 into an image of about six degrees in the horizontal direction without substantially affecting the vertical characteristics of the projected light. The second lens of lens system 52 has a longer focal length to compress the illumination pattern output from the first lens to about three degrees in the vertical direction. Thus, as further discussed below, lens system 52 can provide the appropriate bending for the steerable light to reach fifteen degrees without compromising the shape of hotspot 64.

Referring to FIG. 5, there is shown the semiconductor light sources 35 that are illuminated on source arrays 32, 36, respectively, to produce the high beam pattern illustrated in FIG. 6. As shown, all of the semiconductor light sources 35 of source array 32 are illuminated with the additionally illuminated (with respect to those illuminated for the low beam pattern of FIG. 4) semiconductor light sources 35 producing the spread zone 68 of the high beam pattern illustrated in FIG. 6. Similarly, about another quarter of the semiconductor light sources 35 of source array 36 have been illuminated to produce high beam hot spot 72 of FIG. 6.

As should be apparent to those of skill in the art, the present invention is not limited to any particular number of semiconductor light sources 35 being provided on source arrays 32, 36, respectively, nor is the present invention limited to any particular number of semiconductor light sources being illuminated to obtain desired outputs in a produced beam pattern. Instead, the present invention can be used with any number of semiconductor light sources, determined solely by the amount of light emitted by the particular semiconductor light sources employed, the efficiency with which transfer devices 40, 44, respectively, and lens systems 48, 52, respectively, operate and the desired beam pattern and illumination levels therein. By way of a non-limiting example, in the discussion of steering hotspots which follows, four semiconductor light sources are used to create each hotspot, but it is contemplated that if a higher output semiconductor light source is employed, three or less semiconductor light sources can be employed to create such hot spots.

Figure 7:
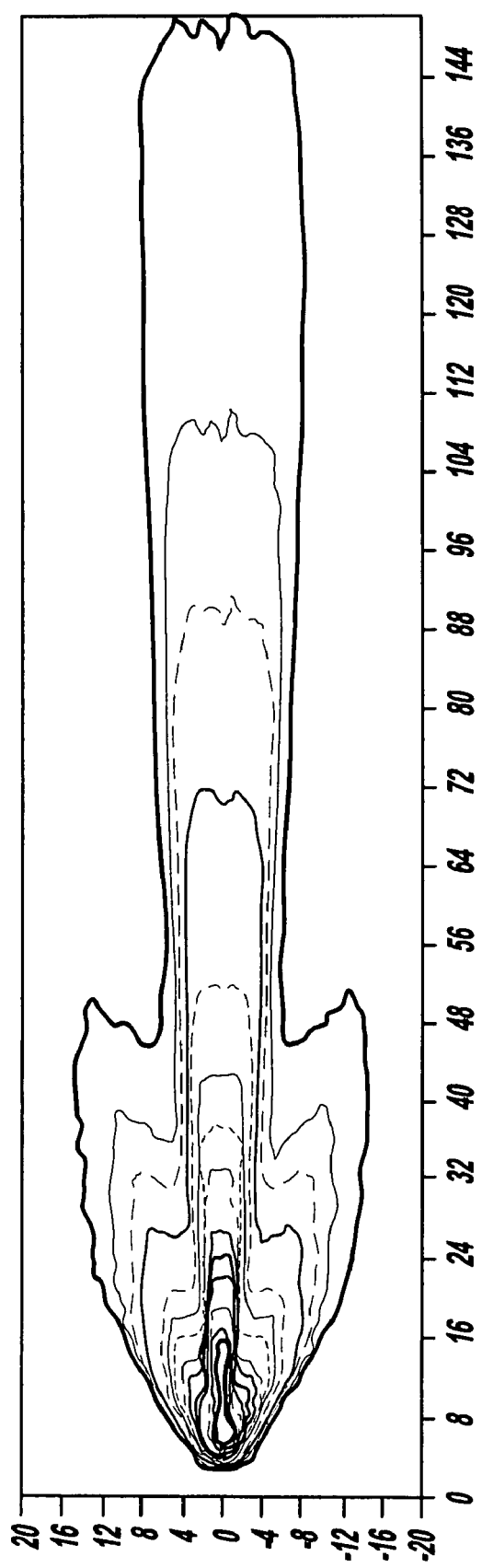
FIG. 7 shows a top view of the low beam pattern of FIG. 3 indicating the intensity of the light of the pattern, in accordance with the present invention.

Referring to FIG. 7, there is shown a schematic representation of a top view (looking down) of the low beam pattern of FIG. 4 wherein the vertical axis of the Figure indicates degrees of horizontal spread of the pattern, the horizontal axis indicates the distance of the pattern from the headlamp system 20, and the color of the pattern indicating line indicates the illumination level of the pattern, corresponding to the illustrated scale.

As discussed above, in addition to the formation of required low beam and high beam patterns, it is also desired to provide dynamic light pattern components, such as steerable light from headlamp system 20, the steerable light illuminating the area about the vehicle over which the vehicle will be traveling as it is turned from a straight path. By way of a non-limiting example, when the vehicle is being turned to the left, it is desirable that a portion of the road in front of the vehicle, to the left, be illuminated.

A controller, not shown, can be operable to illuminate or extinguish additional semiconductor light sources 35 of source array 36 to provide dynamic illumination, as discussed below. The controller can accept inputs such as, but not limited to, steering wheel position, vehicle speed, and vehicle body roll, and will illuminate or extinguish the additional semiconductor light sources as needed. The construction and operation of such a controller is within the common general knowledge of those of skill in the art and will thus not be further described herein.

Referring to FIG. 8, there are shown source arrays 32, 36, respectively, wherein a first increment of steerable light is being added to the low beam pattern shown in FIG. 4 by the controller in response to its received inputs. Specifically, four additional semiconductor light sources 72 on source array 36 have been illuminated. The illumination emitted by these four additional light sources 72 can be directed by lens system 52 to produce the added steering hot spot 76, as shown in FIG. 9, on the low beam pattern. As will be apparent to those of skill in the art, if headlamp system 20 was being operated to produce a high beam, the four semiconductor light sources below light sources 72 can also be illuminated, for a total of eight additional light sources, to provide a high beam steerable light pattern and this is further discussed below, with reference to FIGS. 17 and 18.

Figure 10:
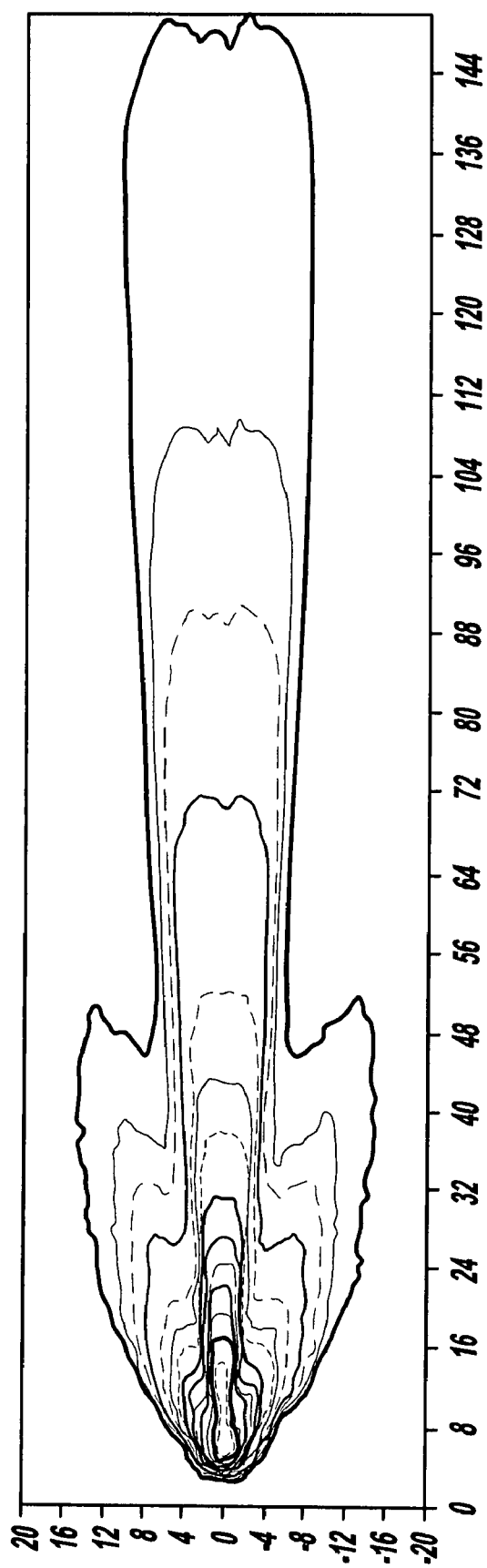
FIG. 10 shows a top view of the low beam pattern of FIG. 9 indicating the intensity of the light of the pattern with the added low beam steering hot spot, in accordance with the present invention.

Referring to FIG. 10, there is shown a schematic representation of a top view of the beam pattern of FIG. 9. As illustrated, steering hot spot 76 of FIG. 9 produces a slight widening of the beam pattern of FIG. 10 to the left (towards the top of the plot, in the illustrated orientation).

Figure 11:
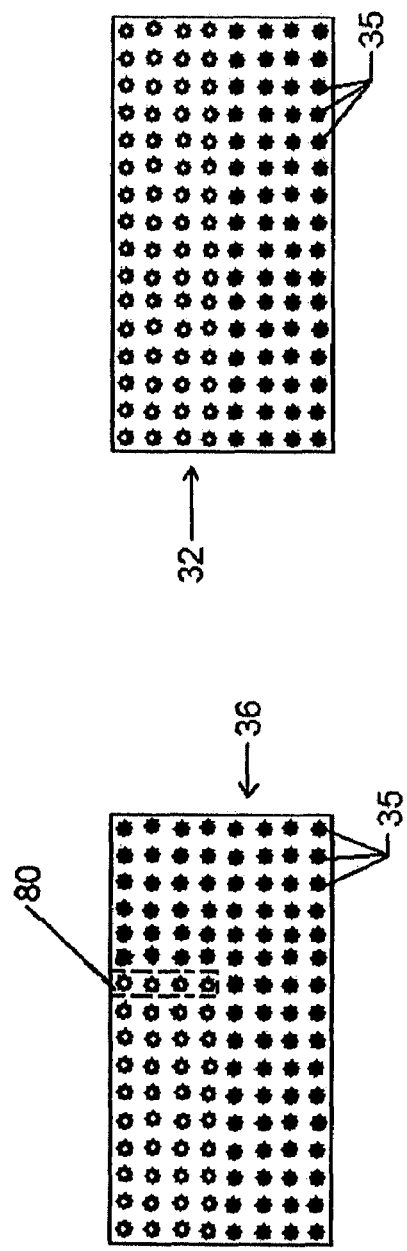
FIG. 11 shows the two arrays of FIG. 8 wherein an additional set of semiconductor light elements have been illuminated on one array to provide a second low beam steering hot spot, in accordance with the present invention.

Referring to FIG. 11, there are shown source arrays 32, 36, respectively, wherein a second increment of steerable light is being added by the controller to the low beam pattern shown in FIG. 9. Specifically, four additional semiconductor light sources 80 on source array 36 have been illuminated. The illumination emitted by these four additional light sources 80 can be directed by lens system 52 to produce the second steering hot spot 84, as shown in FIG. 12, on the low beam pattern.

Figure 12:
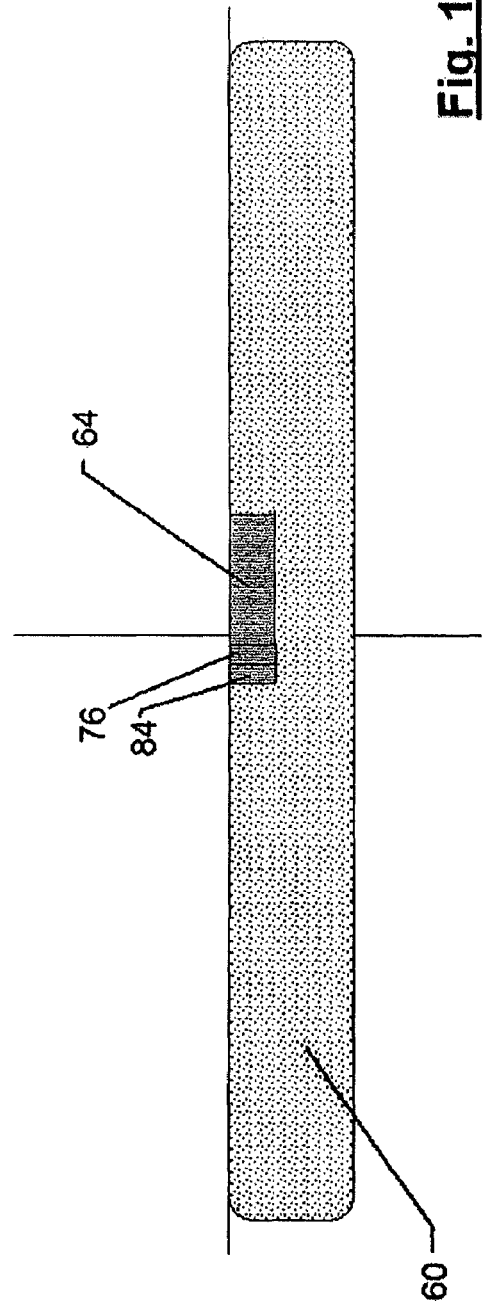
FIG. 12 shows a schematic representation of the low beam pattern with the two low beam steering hot spots produced from the arrays of FIG. 11, in accordance with the present invention.
Figure 13:
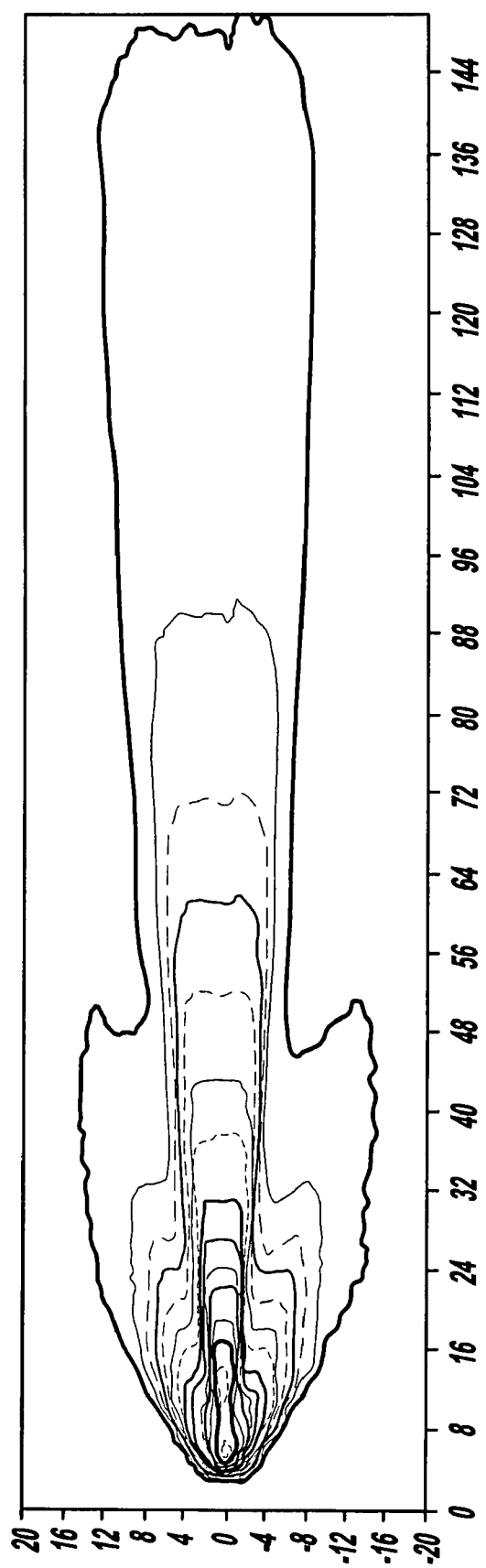
FIG. 13 shows a top view of the low beam pattern of FIG. 12 indicating the intensity of the light of the pattern with the two added steering hot spots, in accordance with the present invention.

Referring to FIG. 13, there is shown a schematic representation of a top view of the beam pattern of FIG. 12. As illustrated, the steering hot spots 76, 80, respectively, of FIG. 12 produce a larger widening of the beam pattern to the left (towards the top of the plot, in the illustrated orientation). If desired, additional increments of steerable light can be added by the controller.

Referring to FIG. 14, there are shown source arrays 32, 36, respectively, wherein a total of eight increments of steerable light 88 have been added by the controller to the low beam pattern of FIG. 12 to produce steering hot spots 76, 84, 92, 96, 100, 104, 108, 112, respectively, as shown in FIG. 15.

Figure 16:
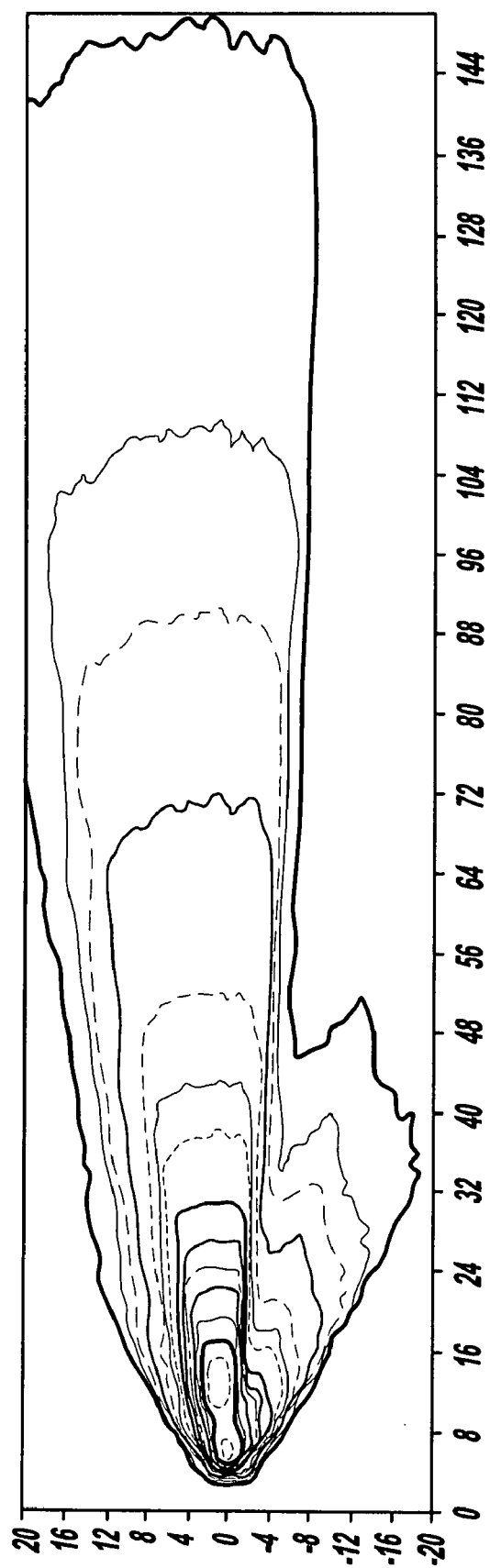
FIG. 16 shows a top view of the low beam pattern of FIG. 15 indicating the intensity of the light of the pattern with the eight steering hot spots, in accordance with the present invention.

Referring to FIG. 16, there is shown a schematic representation of a top view of the beam pattern of FIG. 15. As illustrated, steering hot spots 76, 84, 92, 96, 100, 104, 108, 112, respectively, produce a relatively large widening of the beam pattern to the left (towards the top of the plot, in the illustrated orientation).

While FIG. 14 shows the eight increments 88 having been added all at once, this has been shown for conciseness of description and, as will be apparent to those of skill in the art, the controller can add each increment of steerable light, one by one, or in groups of two or more increments, depending upon the operating conditions of the vehicle, as determined from the inputs to the controller.

Figure 17:
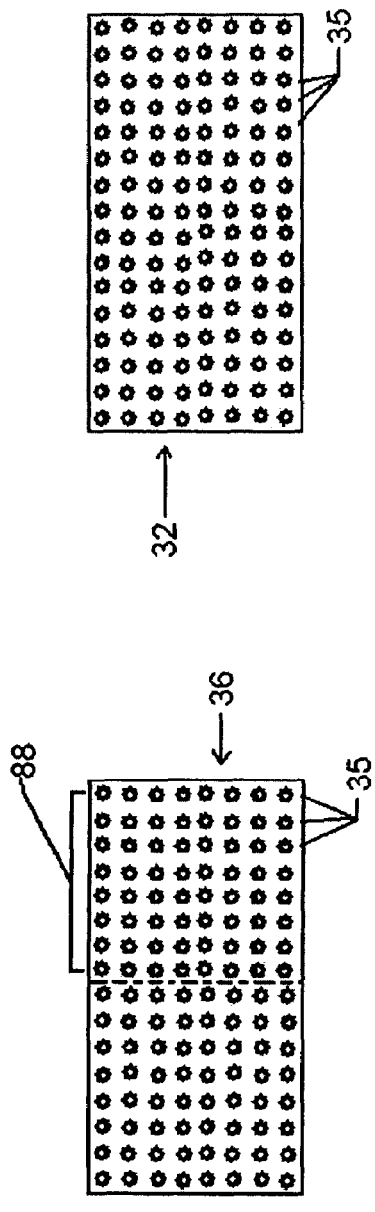
FIG. 17 shows the two arrays of FIG. 14 producing a high beam pattern and wherein eight additional sets of semiconductor light elements have been illuminated on one array to also provide a eight high beam steering hot spots, in accordance with the present invention.
Figure 18:
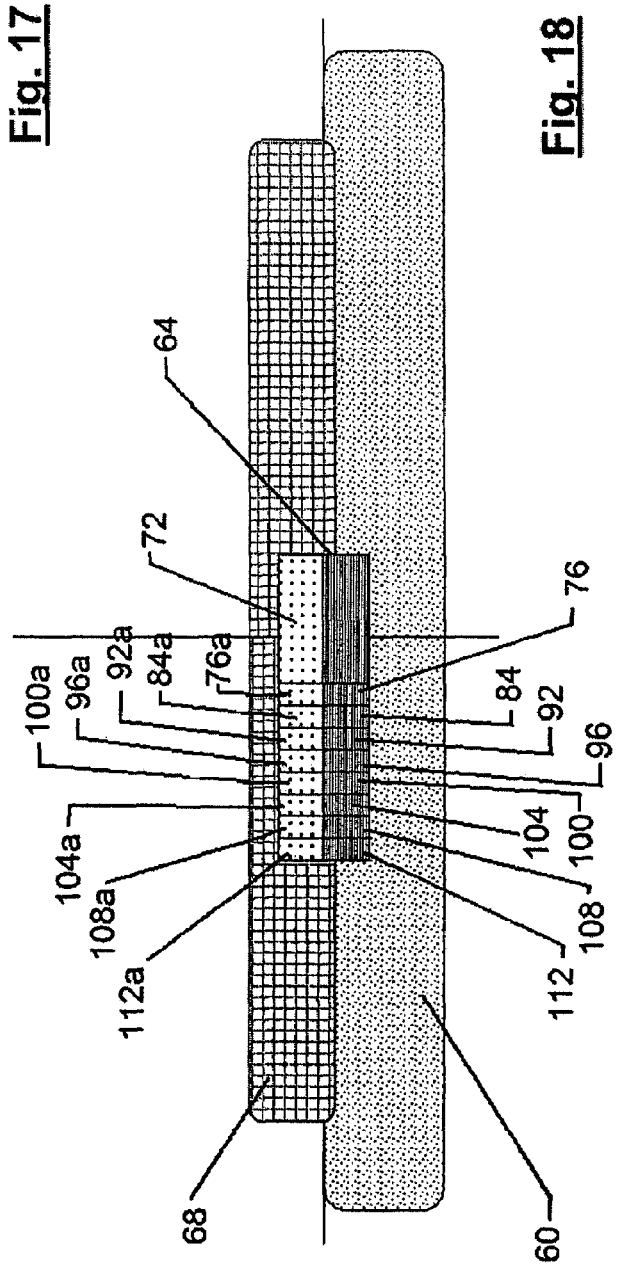
FIG. 18 shows a schematic representation of the high beam pattern with the eight high beam steering hot spots and the eight low beam steering hot spots produced from the arrays of FIG. 17, in accordance with the present invention.

As will be apparent to those of skill in the art, when headlamp system 20 is producing a high beam pattern, high beam steering hot spots 76a, 84a, 92a, 96a, 100a, 104a, 108a, 112a, respectively, can also be provided when needed, by illuminating additional semiconductor light sources 35 on source engine 36, as shown in FIGS. 17 and 18.

While FIGS. 8 through 18 have shown a headlamp for the left hand side of a vehicle, it should be apparent to those of skill in the art that the present invention is not so limited and headlamp system 20 can be employed as either the right or left hand side headlamp. In the case of a headlamp system 20 being used in a right hand side headlamp, the steerable hot spots will be projected onto the right hand side of the low beam and high beam patterns.

By illuminating or extinguishing additional semiconductor light sources 35 on source array 36 and by lens system 52 directing the additional light produced to create additional steering hot spots for increased illumination directed left (or right, for the right hand headlamp), headlamp system 20 provides steerable light without requiring the mechanical movement of light sources or optical system components.

Further, the controller can operate the additional semiconductor light sources 35 at different output levels to achieve desired illumination patterns of the steerable light. For example, the controller can illuminate the semiconductor light sources 35 which produce steering hot spots 108, 112, respectively, at higher output levels than the semiconductor light sources 35 which produce steering hot spots 100, 104, respectively.

Also, while in the embodiment discussed above there can be a direct correspondence between the location of each particular semiconductor light source 35 on source array 32, 36, respectively, and where the light the semiconductor light source 35 emits appears in the produced beam pattern, the present invention is not so limited. Specifically, it is implied that the rightmost increment of four semiconductor light sources 35 in increment 88 of FIG. 14 are producing hot spot 112 while the leftmost increment of four semiconductor light sources 35 in increment 88 are producing hot spot 76 (as shown in FIG. 8). However, such direct correspondence only occurs if the receiving and emitting ends of light pipes in transfer devices 40, 44, respectively, are arranged with such a direct correspondence. As will be apparent to those of skill in the art, such a direct correspondence is not required and, in fact, may be undesired in some circumstances. By way of a non-limiting example, it may be desired that semiconductor light sources 35 on source arrays 32, 36, respectively, which are normally illuminated at the same time as other semiconductor light sources 35 on the respective source array 32 or 36 not be placed adjacent one another on substrate 32 to provide for improved removal of waste heat. In such a case, provided that the receiving and emitting ends of light pipes of the transfer devices 40, 44, respectively, are correctly arranged, the desired output beam pattern can still be obtained.

Further, while in FIGS. 8 through 18 the emitter ends of transfer devices 40, 44 have been shown located in close proximity to one another, as mentioned above this is not required and it is contemplated that in many circumstances at least some of the emitter ends of a transfer device 40 or 44 can be spaced from one another, with respect to their respective lens system 48 or 52, to achieve a desired beam pattern.

As will now be apparent, the present invention provides a headlamp system that forms desired beam patterns from light supplied by semiconductor light sources. The system includes a source array of semiconductor light sources and a lens system to produce the spread components of the desired beam patterns and a source array of semiconductor light sources and a lens system to produce the hot spot components of the desired beam patterns. Light from the semiconductor light sources of each source array can be transferred to the respective lens system by a transfer device comprising a series of light pipes which capture light emitted by the semiconductor light sources and emit the captured light adjacent the respective lens systems. One or both source arrays can include additional semiconductor light sources that can be selectively illuminated or extinguished to provide dynamic beam pattern components, such as steering hot spots in the beam pattern to illuminate areas adjacent the vehicle over which the vehicle will be turned.

By employing transfer devices between the source arrays and the lens systems, the source arrays and lens systems can be spaced from each other, allowing headlamp system 20 to be installed in volumes of smaller size, or of shapes which would not be possible if the lens systems had to directly receive the light emitted by the source arrays.

The above-described embodiments of the invention are intended to be examples of the present invention and alterations and modifications may be effected thereto, by those of skill in the art, without departing from the scope of the invention which is defined solely by the claims appended hereto.

We claim:

1. A headlamp system for a vehicle, comprising:
   a first array of semiconductor light sources;
   a second array of semiconductor light sources;
   a first lens system having at least one lens;
   a second lens system having a single lens, said first lens system and said second lens system operable for producing a desired beam pattern;
   a first transfer device for transferring light emitted from said first array of semiconductor light sources to said first lens system, wherein light from said first array passes through said at least one lens to vertically limit said desired beam pattern, and is projected through said at least one lens to horizontally limit spread of said desired beam pattern; and
   a second transfer device for transferring light emitted from said second array of semiconductor light sources to the second lens system, wherein tight from said second array passes through said single lens, the single lens of said second lens system projects light from said second transfer device in a horizontal direction to produce an illumination pattern output, and compresses the illumination pattern output, allowing said second lens system to produce at least one hot spot component of said desired beam pattern.

2. The headlamp system for a vehicle of claim 1, wherein said first array of semiconductor light sources and said second array of semiconductor light sources are mounted on a common substrate.

3. The headlamp system for a vehicle of claim 1, wherein said first transfer device comprises a fiber optic cable for each respective semiconductor light source in said first array of semiconductor light sources and wherein each respective fiber optic cable has a first end adjacent the respective semiconductor light source, to capture light emitted from the respective semiconductor light source, and a second end to emit the captured light onto said first lens system.

4. The headlamp system for a vehicle of claim 1, wherein said second transfer device comprises a fiber optic cable for each respective semiconductor light source in said second array of semiconductor light sources and wherein each respective fiber optic cable has a first end adjacent the respective semiconductor light source, to capture light emitted from the respective semiconductor light source, and a second end to emit the captured light onto said second lens system.

5. The headlamp system for a vehicle of claim 1, wherein at least some of the semiconductor light sources of said first and second array of semiconductor light sources are selectively illuminated or extinguished to form said desired beam pattern from the headlamp system.

6. The headlamp system for a vehicle of claim 5, wherein said desired beam pattern is selected from the group consisting of a low beam pattern, a high beam pattern, and combinations thereof.

7. The headlamp system for a vehicle of claim 5, wherein additional semiconductor light sources on said second array of semiconductor light sources is illuminated to produce at least one steering hot spot in addition to the desired beam pattern.

8. The headlamp system for a vehicle of claim 7, wherein the number of said steering hot spots produced in addition to said desired beam pattern is dependent upon a parameter selected from the group consisting of the operating speed of the vehicle, the position of the steering wheel of the vehicle, and combinations thereof.

9. The headlamp system for a vehicle of claim 1, said single lens of said second lens system being operable to project the light from said second transfer device into an image of about six degrees in the horizontal direction without substantially altering the vertical characteristics of the projected light, and having a longer focal length to compress the illumination pattern to about three degrees in the vertical direction.

10. A headlamp system for a vehicle, comprising:
a first array of semiconductor light sources;
a second array of semiconductor light sources;
a first lens system including at least one lens;
a second lens system having a single lens;
a first transfer device for transferring light emitted from said first array of semiconductor light sources to said first lens system, wherein light from said first array passes through said at least one lens to vertically limit a desired beam pattern, and is projected through said at least one lens of said first lens system to horizontally limit spread of said desired beam pattern;
a second transfer device for transferring light emitted from said second array of semiconductor light sources to said second lens system, wherein light from said second array passes through said single lens, and said single lens of said second lens system projects light from said second transfer device in a horizontal direction to produce an illumination pattern output, and compresses the illumination pattern output from said second lens system, allowing said second lens system to produce at least one hot spot component of said desired beam pattern; and
wherein at least some of said semiconductor light sources of said first and second array of semiconductor light sources is selectively illuminated or extinguished to form said desired beam pattern from the headlamp system.

11. The headlamp system for a vehicle of claim 10, wherein the first or second transfer device comprises a fiber optic cable for each respective semiconductor light source in the first or second array of semiconductor light sources and wherein each respective fiber optic cable has a first end adjacent the respective semiconductor light source, to capture light emitted from the respective semiconductor light source, and a second end to emit the captured light onto the first or second lens system.

12. The headlamp system for a vehicle of claim 10, wherein said desired beam pattern is selected from the group consisting of a low beam pattern, a high beam pattern, and combinations thereof.

13. The headlamp system for a vehicle of claim 10, wherein additional semiconductor light sources on the second array of semiconductor light sources is illuminated to produce at least one steering hot spot in addition to said desired beam pattern.

14. The headlamp system for a vehicle of claim 13, wherein the number of steering hot spots produced in addition to said desired beam pattern is dependent upon a parameter selected from the group consisting of the operating speed of the vehicle, the position of the steering wheel of the vehicle, and combinations thereof.

15. The headlamp system for a vehicle of claim 10, said single lens of the second lens system being operable to project the light from the second transfer device into an image of about six degrees in the horizontal direction without substantially altering the vertical characteristics of the projected light, and having a longer focal length to compress the illumination pattern to about three degrees in the vertical direction.

16. A headlamp system for a vehicle, comprising:
a first array of semiconductor light sources;
a second array of semiconductor light sources;
a first lens system including at least one lens;
a second lens system having a single lens;
a first transfer device for transferring light emitted from said first array of semiconductor light sources to the first lens system, wherein light from said first array of semiconductor light sources passes through said at least one lens to vertically limit a desired beam pattern and is projected through said at least one lens of said first lens system to horizontally limit spread of said desired beam pattern;
a second transfer device for transferring light emitted from said second array of semiconductor light sources to said second lens system, wherein light from said second array of semiconductor light sources passes through said single lens projects light from said second transfer device in a horizontal direction to produce an illumination pattern output, and compresses the illumination pattern output from said single lens of said second lens system, allowing said second lens system to produce at least one hot spot component of said desired beam pattern;
wherein at least some of the semiconductor light sources of said first and second array of semiconductor light sources are selectively illuminated or extinguished to form said desired beam pattern from said headlamp system; and
wherein additional semiconductor light sources on said second array of semiconductor light sources are illuminated to produce at least one steering hot spot in addition to said desired beam pattern.

17. The headlamp system for a vehicle of claim 16, wherein said first or second transfer device comprises a fiber optic cable for each respective semiconductor light source in said first or second array of semiconductor light sources and wherein each respective fiber optic cable has a first end adjacent the respective semiconductor light source, to capture light emitted from the respective semiconductor light source, and a second end to emit the captured light onto said first or second lens system.

18. The headlamp system for a vehicle of claim 16, wherein said desired beam pattern is selected from the group consisting of a low beam pattern, a high beam pattern, and combinations thereof.

19. The headlamp system for a vehicle of claim 16, wherein the number of said steering hot spots produced in addition to said desired beam pattern is dependent upon a parameter selected from the group consisting of the operating speed of the vehicle, the position of the steering wheel of the vehicle, and combinations thereof.

20. The headlamp system for a vehicle of claim 16, said single lens of said second lens system being operable to project the light from said second transfer device into an image of about six degrees in the horizontal direction without substantially altering the vertical characteristics of the projected light, and having a longer focal length to compress the illumination pattern to about three degrees in the vertical direction.

21. A headlamp system for a vehicle, comprising:
a first array of semiconductor light sources;
a second array of semiconductor light sources;
a first lens system having a single lens;

a second lens system having a single lens, said first lens system and said second lens system operable for producing a desired beam pattern;

a first transfer device for transferring light emitted from said first array of semiconductor light sources to said first lens system, wherein light from said first array passes through said single lens of said first lens system to vertically limit said desired beam pattern, and is projected through said single lens of said first lens system to horizontally limit spread of said desired beam pattern; and a second transfer device for transferring light emitted from said second array of semiconductor light sources to the second lens system, wherein light from said second array passes through said single lens of said second lens system, the single lens of said second lens system projects light from said second transfer device in a horizontal direction to produce an illumination pattern output, and compresses the illumination pattern output, allowing said second lens system to produce at least one hot spot component of said desired beam pattern.

22. The headlamp system for a vehicle of claim 21, wherein said first array of semiconductor light sources and said second array of semiconductor light sources are mounted on a common substrate.

23. The headlamp system for a vehicle of claim 21, wherein the first or second transfer device comprises a fiber optic cable for each respective semiconductor light source in the first or second array of semiconductor light sources and wherein each respective fiber optic cable has a first end adjacent the respective semiconductor light source, to capture light emitted from the respective semiconductor light source, and a second end to emit the captured light onto the first or second lens system.

24. The headlamp system for a vehicle of claim 21, wherein at least some of the semiconductor light sources of said first and second array of semiconductor light sources are selectively illuminated or extinguished to form said desired beam pattern from the headlamp system.

25. The headlamp system for a vehicle of claim 24, wherein said desired beam pattern is selected from the group consisting of a low beam pattern, a high beam pattern, and combinations thereof.

26. The headlamp system for a vehicle of claim 24, wherein additional semiconductor light sources on said second array of semiconductor light sources is illuminated to produce at least one steering hot spot in addition to the desired beam pattern.

27. The headlamp system for a vehicle of claim 26, wherein the number of said steering hot spots produced in addition to said desired beam pattern is dependent upon a parameter selected from the group consisting of the operating speed of the vehicle, the position of the steering wheel of the vehicle, and combinations thereof.

28. The headlamp system for a vehicle of claim 21, said single lens of said second lens system being operable to project the light from said second transfer device into an image of about six degrees in the horizontal direction without substantially altering the vertical characteristics of the projected light, and having a longer focal length to compress the illumination pattern to about three degrees in the vertical direction.

29. A headlamp system for a vehicle, comprising:
a first array of semiconductor light sources;
a second array of semiconductor light sources;
a first lens system having a single lens;
a second lens system having at least one lens, said first lens system and said second lens system operable for producing a desired beam pattern;
a first transfer device for transferring light emitted from said first array of semiconductor light sources to said first lens system, wherein light from said first array passes through said single lens to vertically limit said desired beam pattern, and is projected through said single lens to horizontally limit spread of said desired beam pattern; and
a second transfer device for transferring light emitted from said second array of semiconductor light sources to the second lens system, wherein light from said second array passes through said at least one lens, the at least one lens of said second lens system projects light from said second transfer device in a horizontal direction to produce an illumination pattern output, and compresses the illumination pattern output, allowing said second lens system to produce at least one hot spot component of said desired beam pattern.

30. The headlamp system for a vehicle of claim 29, wherein said first array of semiconductor light sources and said second array of semiconductor light sources are mounted on a common substrate.

31. The headlamp system for a vehicle of claim 29, wherein the first or second transfer device comprises a fiber optic cable for each respective semiconductor light source in the first or second array of semiconductor light sources and wherein each respective fiber optic cable has a first end adjacent the respective semiconductor light source, to capture light emitted from the respective semiconductor light source, and a second end to emit the captured light onto the first or second lens system.

32. The headlamp system for a vehicle of claim 29, wherein at least some of the semiconductor light sources of said first and second array of semiconductor light sources are selectively illuminated or extinguished to form said desired beam pattern from the headlamp system.

33. The headlamp system for a vehicle of claim 32, wherein said desired beam pattern is selected from the group consisting of a low beam pattern, a high beam pattern, and combinations thereof.

34. The headlamp system for a vehicle of claim 32, wherein additional semiconductor light sources on said second array of semiconductor light sources is illuminated to produce at least one steering hot spot in addition to the desired beam pattern.

35. The headlamp system for a vehicle of claim 34, wherein the number of said steering hot spots produced in addition to said desired beam pattern is dependent upon a parameter selected from the group consisting of the operating speed of the vehicle, the position of the steering wheel of the vehicle, and combinations thereof.

36. The headlamp system for a vehicle of claim 29, said at least one lens of said second lens system being operable to project the light from said second transfer device into an image of about six degrees in the horizontal direction without substantially altering the vertical characteristics of the projected light, and having a longer focal length to compress the illumination pattern to about three degrees in the vertical direction.

* * * * *